United States Patent [19]

Kato

[11] 4,441,689

[45] Apr. 10, 1984

[54] BONNETLESS COMPACT DESIGN GLOBE VALVE

[76] Inventor: Tomozo Kato, 32-6, Edogawa 6-Chome, Edogawa-ku, Tokyo, 183, Japan

[21] Appl. No.: 333,826
[22] PCT Filed: Jun. 5, 1981
[86] PCT No.: PCT/JP81/00132
§ 371 Date: Dec. 10, 1981
§ 102(e) Date: Dec. 10, 1981
[87] PCT Pub. No.: WO82/04298
PCT Pub. Date: Dec. 9, 1982

[51] Int. Cl.³ .............................. F16K 31/44
[52] U.S. Cl. ..................... 251/366; 251/214
[58] Field of Search .......... 251/366, 214, 318

[56] References Cited

U.S. PATENT DOCUMENTS

| Re. 23,985 | 4/1955 | MacGregor | 251/366 |
| 2,274,876 | 3/1942 | Trott | 251/264 |
| 3,257,095 | 6/1966 | Siver | 251/330 |
| 3,295,856 | 1/1967 | Bredtschneider | 251/214 |

Primary Examiner—A. Michael Chambers
Attorney, Agent, or Firm—Flynn, Thiel, Boutell & Tanis

[57] ABSTRACT

A bonnetless outside-screw type globe valve made of carbon steel, 3½ nickel steel or other kind of stainless steel and designed to be usable for controlling a high-pressure fluid is provided. A yoke 19 is screw-joined directly to the body 1, and a stuffing box 7 is provided in the body 1. A flanged cylindrical buck seatring 18 is screwedly fixed to the lower portion of the stuffing box 7, and a disc guide hole 9 arranged to make a slide fit with the disc 16 is formed in said lower portion of the stuffing box. The valve body seat 10 and the inlet and outlet holes 12 and 13 are formed smaller in diameter than the pipeline connected thereto, and each of said inlet hole 12 and outlet hole 13 is provided with a throttling portion (14, 15). This valve is suited for use in the petrochemical apparatuses for the control of a high-pressure fluid.

3 Claims, 1 Drawing Figure

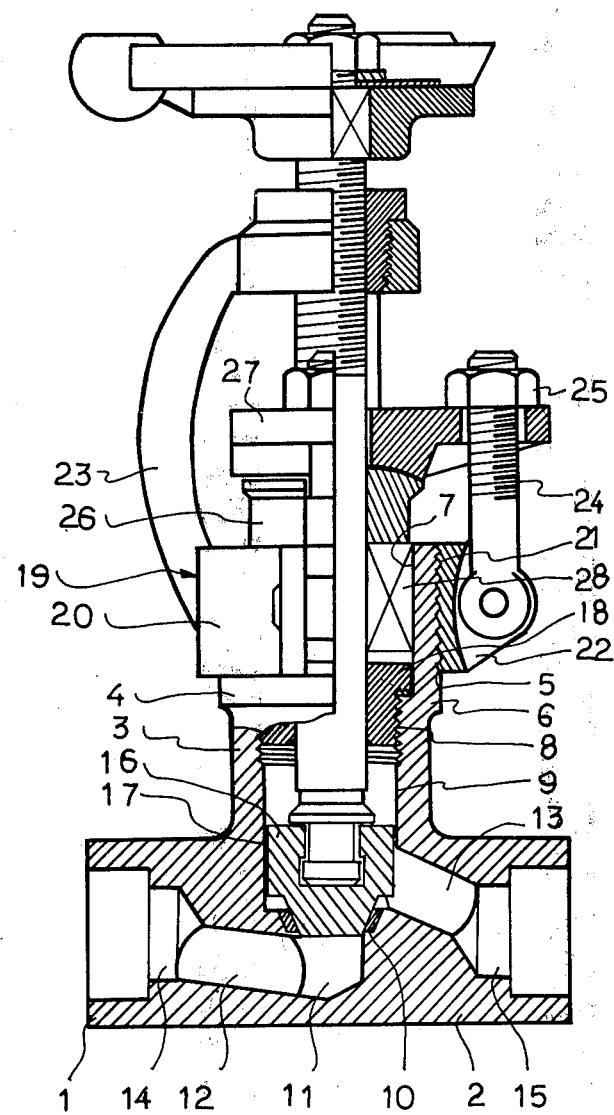

BONNETLESS COMPACT DESIGN GLOBE VALVE

DESCRIPTION

1. Field of the Art

This invention relates to a bonnetless compact design globe valve in which a yoke is directly screw-joined, with no bonnet being provided, to the body of an outside-screw type compact design globe valve having its fluid conduit hole and valve seat formed smaller in diameter than the pipeline connected thereto, thereby to attain a weight reduction of the valve, and also the valve disc is guided along the inner wall surface of the body so that the disc won't vibrate to produce pulsating pressure during control of the fluid, thereby making the valve favorably adaptable to control of a high-pressure fluid.

2. Background of the Art

It is well known that the globe valves are used for controlling the flow rate of a fluid or fluid pressure in pipes. Such valves are also widely used in petrochemical apparatuses where the control of fluid flow rate and pressure is essential. Generally, globe valves have a high fluid resistance and are deemed to be one of the principal causes of fluid pressure loss. In such valves, therefore, in order to minimize pressure loss, the fluid conduit hole and valve seat are usually formed equal in diameter to the pipeline connected thereto. Thus, in these valves, the diameters of the fluid conduit hole and valve seat, which are the fundamental factors for deciding the valve geometry, are regulated by the pipeline involved, so that the higher the fluid pressure to be controlled, the greater must be made the inner wall thickness of the valve, resulting in a greater weight of the valve. Also, in the conventional globe valves, the body and bonnet are combined together by bolting the flanges provided integral to said body and bonnet, respectively, so that for use where the fluid pressure to be controlled is high, it is required not only to increase the wall thickness of the body but also to use thick flanges and strong bolts. Further, a gasket is used at the joint of the flanges joining the body and bonnet so as to prevent leakage of the fluid from this section. Such gasket is provided with sufficient firmness and fastness to prevent leakage of the fluid during its control, but if there once occurs a fluid leakage due to vibration of the valve during its controlling operation or for other causes, there is available no effective measure for checking such leakage. Thus, when a leakage occurs from the gasket joint, there is no alternative but to replace the gasket with a new one by stopping the flow of the fluid in the pipeline and separating the body and the bonnet. Moreover, since the valve disc adapted for directly controlling the fluid at the open edge of the valve seat is not secured to, but rather, is merely loosely engaged with, an end of the valve rod, said disc might vibrate in the course of fluid control to cause generation of a pulsating pressure of the fluid in the connected pipeline, resulting in improper control of the fluid.

OBJECT OF THE INVENTION

This invention has for its object to provide a bonnetless, light-weight compact design globe valve which is free of said defects of the prior globe valves and in which the fluid conduit hole is formed smaller in diameter than the pipeline connected thereto so that the fundamental factors for deciding the valve geometry can be defined with reference to the minimum requirements within a range where the valve can be effectively used for controlling a fluid with a relatively high pressure, and which also has no fear of causing any leakage of the fluid from the gasket nor any possibility to cause vibration of the valve during its fluid control.

DISCLOSURE OF THE INVENTION

A feature of this invention resides in that a yoke is joined directly to the body unlike the conventional valves where said yoke is formed integral with the bonnet or is joined to the separately provided bonnet. This can make unnecessary the thick-walled flanges and strong bolts that are used in the conventional valves for joining the body and the bonnet. It also makes unnecessary the gasket provided at the joint of the body and bonnet in the prior valves, thus eliminating any fear of fluid leakage from this portion. Also, in the present invention, a stuffing box is provided in the body, not in the bonnet as in the conventional valves. Further, both the valve body seat and fluid conduit hole are formed smaller in diameter, in a practical range, than the pipeline connected to the valve to allow a reduction of the valve size as well as a sizable reduction of the valve weight. Still further, the disc is provided separately from the valve rod and a disc guide hole is formed in the body to guide the disc which controls the fluid. This arrangement can eliminate any likelihood of vibration of the disc during its fluid controlling operation and allows always stable fluid control.

BRIEF DESCRIPTION OF THE DRAWING

The drawing is a partial section of a bonnetless compact design globe valve according to this invention, and also shows as a part of its side which is perpendicular to the cutting plane said section.

THE BEST MODE OF CARRYING OUT THE INVENTION

The invention is described in detail hereinbelow with reference to the accompanying drawing.

Referring to the drawing, the body 1 consists of a horizontal portion 2 having a circular sectional shape and provided with a fluid conduit hole and a branch vertical portion 3 also having a circular sectional shape and disposed centrally of said horizontal portion 2, both said body portions 2 and 3 being formed integral to each other by stamp forging. Carbon steel, 3½ nickel steel or 18% chromium and 8% nickel stainless steel may be used as the material for producing the body 1. At the upper end of the vertical body portion 3 there is provided a body head portion 4 having a slightly greater diameter than the middle part of the vertical body portion 3. On the outer peripheral surface of said body head portion 4 is provided a screw portion 5 for screw-joining a yoke 19 thereto. The screw portion 5 does not extend to the lower end portion 6 of said body head portion 4 so that the yoke screw portion 21 is checked at said lower end portion 6. The length of said screw portion 5 is decided with a certain allowance so that the upper end face of the screw portion 21 of said yoke 19 will become flush with the corresponding upper end face of the vertical body portion 3. In said vertical body portion 3 is also provided a stuffing box 7 which opens to a central part of the end face of the body head portion 4. This stuffing box 7 has a proper depth so as not to cause any leakage of the high-pressure fluid and also has a diameter large enough to allow passage of the disc 16. It is desirable that said stuffing box 7 is provided at the head portion 4 of the vertical body portion 3. This permits formation of the vertical body portion 3 with a substantially uniform wall thickness. At the lower part of the stuffing box 7 is provided an inside screw portion 8 which is slightly smaller in diameter than the stuffing box 7. A flanged cylindrical buck seat ring 18 having a screw on its outer peripheral surface is screwed into said inside screw portion 8 and thereby is fixed in position. Said buck seat ring 18 has its flange secured to the lower end face of the stuffing box 7 to inhibit penetration of the high pressure fluid from the inside screw portion 8. In order to further encourage this effect, it is desirable to provide the grooves with thread-like ridges around the back side of the flange of said buck seat ring 18 such that said thread-like ridges will bite into the lower end face of the stuffing box 7. A disc guide chamber 9 is also formed in the lower part of the inside screw portion 8. Said disc guide chamber 9 has a slightly smaller diameter than the inside screw portion 8 and is formed separately from the valve rod. It is also so designed that it makes a slide fit with the cylindrical portion 17 of the disc 16 which is arranged to loosely engage with the button-head end of the valve rod. In view of the possible use of the valve for a high-temperature fluid, there is provided a sufficient clearance between the cylindrical portion 17 of the disc 16 and the disc guide chamber 9 so as not to cause any "dragging" along the opposing surfaces of said cylindrical portion 17 and disc guide chamber 9 even under a thigh-temperature condition. A body seat 10 is provided at the lower end face of said disc guide chamber 9. This body seat 10 is formed smaller in diameter than the pipe connected to the valve unlike in the conventional globe valves. This can lessen the force loaded to the valve rod during control of the fluid to facilitate the valve operation and also makes it possible to reduce the body seat diameter which is an essential factor in deciding the valve geometry, thereby allowing a reduction of size and weight of the whole valve assembly. The body seat diameter is established to be a certain value according to the size of the valve and the operating conditions, that is, the maximum amount of the fluid passable through the valve when it is full open and the pressure of the fluid passed, so as to allow use of the valve over a wide pressure range. A vertical fluid guide hole 11 is formed in the lower portion of the body seat 10.

In the horizontal body portion 2 are formed an inlet hole 12 opening to an end face thereof and an outlet hole 13 opening to the other end face. Both of said inlet hole 12 and outlet hole 13 are smaller in diameter than the pipeline connected thereto. These holes are not throttled by a single stage but an inlet throttling portion 14 and an outlet throttling portion 15 are provided to minimize the pressure loss in this area. Also, the inlet hole 12 is formed in connection to the vertical guide hole 11 and the outlet hole 13 in connection to the disc guide chamber 9. Further, the outlet hole 13 is so formed as to connect to the peripheral edge of the lower end face of the disc guide chamber 9. This allows smooth flow of the fluid passing the body seat 10 and also makes it possible to lessen the valve lift, thereby allowing a weight reduction of the whole valve assembly.

The yoke 19 joined to the head portion 4 of the vertical body portion 3, unlike the conventional yokes, has a ring-like fixing portion 20 having provided on its inner peripheral surface a screw portion 21 designed to engage with the corresponding screw portion 5 of the body head portion 4. This fixing portion 20 is substantially equal in length to the screw portion 5 of the body head portion 4. Also, on the outer peripheral surface of said fixing portion 20, there are integrally provided two arm portions 22 spaced-apart from each other at the opposing positions and two similarly spaced-apart opposing stanchion portions 23 at the positions with an angular spacing of about 90° from said respective arm portions 22. The fixing portion 20 stays free of any other force than the clamping force on the disc acting on the yoke screw portion 21. Also, since said two arm portions 22 and two stanchion portions 23 function as a reinforcement, said fixing portion 20 may be of a small wall thickness. This leads to a significant weight reduction in comparison with the conventional types of globe valves. Further, a gland bolt 24 is pivoted to each of said two arm portions 22, and a pressing force is applied to a gland flange 27 and a gland 26 by adjusting a gland nut 25 to thereby maintain the gland packing 28 under an airtight pressure. Thus, since the clamping force on the gland packing 28 can be freely adjusted, even if any leakage should occur from this section in use of the valve, such leakage can be checked by increasing the clamping force on the gland packing.

The bonnetless compact design globe valve according to this invention is suited for use as a control valve in the petrochemical apparatuses or other chemical installations having a high necessity of piping with a plurality of valves by a prefabrication construction method.

What is claimed is:

1. An outside screw-type globe valve, comprising:
a one-piece valve body having an elongated main body portion and a branch body portion extending transversely from said main body portion between the longitudinal ends thereof, said main body portion having a through flow passage extending lengthwise thereof, said passage having a stationary valve seat defining a valve opening which is transversely aligned with and opens toward said branch body portion, said through flow passage including inlet and outlet sections which respectively communicate with opposite sides of said valve opening, said branch body portion being hollow and having a central cylindrical internal opening therethrough, said central cylindrical internal opening comprising a disc guide chamber extending axially outwardly from said through flow passage and being transversely aligned with said valve seat, an inside screw threaded portion extending axially outwardly from the outer end of said disc guide chamber and a stuffing box chamber extending axially outwardly from the outer end of said inside screw threaded portion to the outer end of said branch body portion, said stuffing box chamber being of larger diameter than said inside screw threaded portion and having an annular end face at the inner end thereof which end face extends radially inwardly to the outer end of said inside screw threaded portion, said branch body portion having a radially outwardly enlarged head portion at the outer end thereof, said enlarged head portion being externally screw threaded from the outer end thereof to a location close to but spaced outwardly from the inner end of said enlarged head portion; a yoke having an internally screw-threaded annular fixing portion which is screw-threaded onto said enlarged head portion of said branch body portion, the length of the internal screw thread of said annular fixing portion being equal to the length of the external screw thread of said enlarged head portion so that the inner end of the screw thread of said annular fixing portion is bottomed on the inner end of the screw thread of said enlarged head portion; a valve operating screw having a stem that extends through said internal opening of said branch body portion, a valve disc mounted on the inner end of said stem for movement within said disc guide chamber toward and away from sealing engagement with said valve seat; an annular seat ring sleeved on said stem, said seat ring having an externally threaded portion at the inner end thereof and which is screw threaded into said inside screw thread portion of said internal opening of said branch body portion, said seat ring having a radially outwardly projecting annular flange at the outer end thereof and projecting into said stuffing box chamber, said flange having an inner annular surface opposed to said annular end face of said stuffing box chamber, said inner annular surface having ridges which bite into said annular end face to prevent leakage of fluid therepast; and packing material disposed in said stuffing box chamber to prevent leakage of fluid.

2. A valve as claimed in claim 1 in which the outer end face of said yoke is flush with the outer end face of said branch body portion.

3. A valve as claimed in claim 2 in which said branch body portion has an inner section which is of smaller diameter than said enlarged head portion, said disc guide chamber and said inner screw threaded portion being provided in said inner section of said branch body portion and said stuffing box chamber being provided in said enlarged head portion.

* * * * *